US 11,789,350 B2

(12) United States Patent
Goolab

(10) Patent No.: US 11,789,350 B2
(45) Date of Patent: Oct. 17, 2023

(54) CELESTIAL BODY IMAGE PROJECTION SYSTEM

(71) Applicant: Anthony Goolab, Luton (GB)

(72) Inventor: Anthony Goolab, Luton (GB)

(*) Notice: Subject to any disclaimer, the term of this patent is extended or adjusted under 35 U.S.C. 154(b) by 273 days.

(21) Appl. No.: 16/871,975

(22) Filed: May 11, 2020

(65) Prior Publication Data
US 2021/0349383 A1 Nov. 11, 2021

(51) Int. Cl.
| | | |
|---|---|---|
| *G03B 21/60* | (2014.01) | |
| *G06Q 30/0241* | (2023.01) | |
| *B64G 1/66* | (2006.01) | |
| *G09F 19/08* | (2006.01) | |
| *G09F 19/18* | (2006.01) | |

(52) U.S. Cl.
CPC ............ *G03B 21/60* (2013.01); *B64G 1/66* (2013.01); *G06Q 30/0276* (2013.01); *G09F 19/18* (2013.01)

(58) Field of Classification Search
CPC ...... G03B 21/60; B64G 1/66; G06Q 30/0276; G09F 19/18
USPC ...................................................... 244/158.1
See application file for complete search history.

(56) References Cited

U.S. PATENT DOCUMENTS

| | | | | | |
|---|---|---|---|---|---|
| 2,827,830 | A | * | 3/1958 | Vaux ...................... | G03B 21/00 434/286 |
| 3,726,019 | A | * | 4/1973 | Adler ...................... | A63H 13/15 33/18.1 |
| 4,020,568 | A | * | 5/1977 | Tajima ................... | G09B 27/02 434/286 |
| 4,453,224 | A | * | 6/1984 | Crooks, Jr. .......... | G01C 11/025 359/399 |
| 4,714,140 | A | * | 12/1987 | Hatton ................... | E02D 3/026 414/909 |

(Continued)

FOREIGN PATENT DOCUMENTS

| | | | | |
|---|---|---|---|---|
| EP | 3712645 A1 | * | 9/2020 | ........... G01S 17/894 |
| GB | 2568214 A | * | 5/2019 | ............. G03B 21/56 |

(Continued)

OTHER PUBLICATIONS

Ron Abileah et al., Video from earth orbiting satellites (for oceanographers), Conference: Oceans 2015—MTS/IEEE Washington, Oct. 2015, 8 pages (Year: 2015).*

(Continued)

*Primary Examiner* — Stephanie E Bloss
*Assistant Examiner* — Kevin C Butler
(74) *Attorney, Agent, or Firm* — Fish IP Law, LLP

(57) ABSTRACT

A lunar image projection system is configured primarily for projecting and viewing images on the lunar surface, eg for lunar advertising, and which utilizes a projector that suitably operates to project and target an image onto an area in the dark phase and suitably on the far side of the moon, the system may further include a camera that operates to capture the image as projected on the moon and a transmitter to transmit the captured image to a remote viewer back on earth, the system thereby facilitating the use of the moon as a display screen for images, without obtruding on the appearance of the moon as viewed from earth, and when deployed on the far side with further advantage of avoiding the effect of contrast loss due to earth shine that the moon's near side surface is exposed to.

19 Claims, 2 Drawing Sheets

(56) References Cited

U.S. PATENT DOCUMENTS

| | | | | |
|---|---|---|---|---|
| 5,323,867 | A * | 6/1994 | Griffin | B25J 11/0025 |
| | | | | 180/22 |
| 5,897,156 | A * | 4/1999 | Hayard | B64G 1/16 |
| | | | | 901/1 |
| 6,116,545 | A * | 9/2000 | Salvatore | B64G 1/007 |
| | | | | 244/158.5 |
| 6,267,196 | B1 * | 7/2001 | Wilcox | B60K 17/342 |
| | | | | 180/209 |
| 6,343,938 | B1 * | 2/2002 | Moreland | G09B 27/06 |
| | | | | 40/540 |
| 8,515,595 | B2 * | 8/2013 | Jones | G09F 19/22 |
| | | | | 701/2 |
| 8,947,524 | B2 * | 2/2015 | Altwaijry | G01S 5/16 |
| | | | | 348/135 |
| 9,266,627 | B1 * | 2/2016 | Anderson | B64G 99/00 |
| 10,339,718 | B1 * | 7/2019 | Kamal | H04N 9/3194 |
| 10,584,504 | B2 * | 3/2020 | Drakulich | A63B 24/0075 |
| 10,634,575 | B2 * | 4/2020 | Miranda | G01M 3/38 |
| 11,049,282 | B2 * | 6/2021 | Zhang | G06T 7/80 |
| 11,158,128 | B2 * | 10/2021 | Chojnacka | G06T 7/73 |
| 2001/0018810 | A1 * | 9/2001 | Chafer | G09F 21/06 |
| | | | | 40/584 |
| 2001/0020296 | A1 * | 9/2001 | Chafer | G06Q 40/02 |
| | | | | 725/1 |
| 2002/0121574 | A1 * | 9/2002 | Davis | B64G 1/365 |
| | | | | 244/171 |
| 2009/0153811 | A1 * | 6/2009 | Braiman | H04N 9/3129 |
| | | | | 353/30 |
| 2009/0303313 | A1 * | 12/2009 | Yukich | H04N 13/393 |
| | | | | 348/51 |
| 2010/0299016 | A1 * | 11/2010 | Benzler | E04H 4/1654 |
| | | | | 701/26 |
| 2011/0320069 | A1 * | 12/2011 | Jones | G09F 19/22 |
| | | | | 701/2 |
| 2019/0353917 | A1 * | 11/2019 | Joseph | G02B 30/54 |
| 2021/0067750 | A1 * | 3/2021 | Sandow | H04N 9/3182 |
| 2021/0067752 | A1 * | 3/2021 | Sandow | G06T 15/00 |
| 2021/0078733 | A1 * | 3/2021 | Imamura | B64G 1/244 |
| 2021/0349383 | A1 * | 11/2021 | Goolab | G03B 17/54 |
| 2022/0094834 | A1 * | 3/2022 | Schiller | H04N 23/74 |

FOREIGN PATENT DOCUMENTS

| | | | | |
|---|---|---|---|---|
| JP | 2018032884 | A * | 3/2018 | H04B 10/116 |
| RU | 2047911 | C1 * | 11/1995 | |
| WO | WO-2010090823 | A2 * | 8/2010 | G09F 19/22 |
| WO | WO-2014021743 | A2 * | 2/2014 | B64G 1/10 |
| WO | WO-2019173149 | A1 * | 9/2019 | B64G 1/1021 |
| WO | WO-2021153569 | A1 * | 8/2021 | |

OTHER PUBLICATIONS

Huadong Guo et al., Manual of Digital Earth—Chapter 3 Remote Sensing Satellites for Digital Earth, Springer, 2020, pp. 55-119 (Year: 2020).*

J.W. Hovenier et al., Symmetry and structure of reflection matrices of celestial bodies with particulate surfaces, Astronomy & Astrophysics, Feb. 26, 2016, 6 pgs (Year: 2016).*

Qizhi Huang et al., An imaging algorithm for a lunar orbit interferometer array, Astronomical Journal, May 21, 2018, 15 pgs (Year: 2018).*

Journal of Air Law and Commerce, Commercialization of Space Activities—The Laws and Implications, vol. 82 Issue 1 Art. 4, 2017, 25 pgs (Year: 2017).*

GISGeography, Passive vs Active Sensors in Remote Sensing, GISGeography, Oct. 29, 2021, 13 pgs (Year: 2021).*

John A. Christian et al., Lunar Crater Identification in Digital Images, Springer, Sep. 14, 2020, 94 pgs (Year: 2020).*

Paul J. Godin et al., Laboratory investigations of Lunar ice imaging in permanently shadowed regions using reflected starlight, Elsevier, Mar. 2, 2020, 12 pgs (Year: 2020).*

Ting Lan et al., Modeling of Lunar Digital Terrain Entropy and Terrain Entropy Distribution Model, IEEE Transactions on Geoscience and Remote Sensing, vol. 59, No. 2, Feb. 2021, pp. 1052-1065 (Year: 2021).*

A. Orszag, Moon Distance Measurement by Laser, Ecole Polytechnique, Paris Paper 69D12-622, pp. 1681-1689, 1963 (Year: 1963).*

Li Xianhua, Reflectance Retrieval from Lunar Surface Remote Sensing Image, IEEE DOI: 10.1109/CJMW.2008.4772421, Date of Conference: Sep. 10-12, 2008 (Year: 2008).*

Chaofeng Ren, Laser Spot Center Location Method for Chinese Spaceborne GF-7 Footprint Camera, MDPI—Sensors, Apr. 18, 2020, 15 pgs (Year: 2020).*

Kazuya Yoshida, SPRITE-SAT: a Micro Satellite for Scientific Observation of Transient Luminous Events and Terrestrial Gamma-ray Flashes, Trans. JSASS Aerospace Tech Japan, vol. 8 No. ists27, 2010 pp. Tm_7-Tm_12 (Year: 2010).*

John McDonald et al., Terrain Visualization and Data Discovery using Lunar High-Resolution Laser Altimeter Data Sets, IEEE, 2012, 5 pgs (Year: 2012).*

PCT/RU2013, Written Opinion of the International Searching Authority, dated Jul. 31, 2013, 6 pgs (Year: 2013).*

Can We Turn the Moon into A Projection TV?, The Lounge, Keerbal Space Program; https://forum.kerbalspaceprogram.com/index.php?/topic/151419-can-we-turn-the-moon-into-a-projection-tv/; Nov. 3, 2016 (Year: 2016).*

Sharing ideas at massive scale, ideas.ted.com, Roston, T.; http://ideas.ted.com/sharing-ideas-at-massive-scale, Dec. 4, 2015 (Year: 2015).*

David J. Harding et al., Satellite Laser Altimetry of Terrestrial Topography: Vertical Accuracy as a Function of Surface Slope, Roughness, and Cloud Cover, IEE, vol. 32 No. 2, Mar. 1994, 11 pgs (Year: 1994).*

Andrew Newton et al, Air-LUSI: Development of a pointing and tracking control system for lunar spectral measurements, Elsevier, Jul. 2, 2020, 9 pgs (Year: 2020).*

Goodby Silverstein & Partners San Francisco advertising agency for subbrand: Rolling Rock Beer, https://adsspot.me/media/tv-commercials/rolling-rock-beer-satellite-moonvertising-b5af4adb3e22, Mar. 2008, 1 pg (Year: 2008).*

Erik Brown, The Greatest Billboard of All Time: The Moon, https://bettermarketing.pub/the-greatest-billboard-of-all-time-the-moon-f8e5e7781690, Aug. 8, 2020, 7 pgs (Year: 2020).*

Jonfliesgoats, Can We Turn the Moon into A Projection TV?, The Lounge, Keerbal Space Program; https://forum.kerbalspaceprogram.com/index.php?/topic/151419-can-we-turn-the-moon-into-a-projection-tv/; Nov. 3, 2016 (Year: 2016).*

Steven Kurutz, Moonvertising, New York Times, Dec. 12, 2008, 1 page (Year: 2008).*

Patrick Winn, Get ready for ads on the moon, GlobalPost, Published 7:48 a.m. Aug. 17, 2015, 3 pg(s) (Year: 2015).*

KidsPlace USA, New Fireworks Disneyland Projection at Rivers of America Remember Dreams Come True Jun. 2017 [4K], https://youtu.be/gVKm_P2810g, https://www.youtube.com/watch?v=gVKm_P2810g, 2017, 1 page (Year: 2017).*

RabCup Corp, https://rabcup.com/?gclid=Cj0KCQiAo-yfBhD_ARIsANr56g5VGy_Te7jluVua0j9TI1hU5GmREhED7pMIMJfvb7kHG8a9gXr55NlaAhA_EALw_wcB (https://rabcup.com) Los Angeles, CA, Jul. 28, 2015, 1 page (Year: 2015).*

* cited by examiner

CELESTIAL BODY IMAGE PROJECTION SYSTEM

BACKGROUND OF THE INVENTION

Field of the Invention

The present invention concerns improvements in and relating to methods and systems for projecting and viewing images on the lunar surface or surface of other celestial bodies. The images may be used for entertainment, advertising, scientific research or other practical purposes.

Background

Space research and exploration is an important and long-term vital endeavor for the human race but remains extremely costly and difficult to finance whether by governmental funding or by private funding. In the US the cutting of NASA budgets has led to cancellation and deferment of many projects. The private sector is expected to step-in to fill some of the void.

Private companies such as Space-X are making in-roads into providing more cost-efficient support services for the International Space Station and the gradual advances in design of for example re-usable rockets promise potentially lower costs for transporting materials into space in future. However, ambitious projects such as lunar colonization or even manned Mars missions and colonization are very hard for private companies and private finance to realize. In many projects currently underway or under research the use of advertising and related sponsorship is a key element of the financing but it is difficult to manage to achieve the extremely high levels of funding required.

One important new arena for conveying information and as a means for advertising and thereby helping finance and sponsor space research and exploration is the casting or projection of images onto spacecraft and onto bodies such as the lunar surface.

A number of such systems have been proposed in recent years and examples are described and illustrated in journals and patent applications such as WO2014021743 in which promotional installations (eg the latest model of a car) are carried in space by satellites and are filmed against the backdrop of space for transmission of advertising images back to the earth.

In a similar manner, WO2019299 (Encounter 2001 LLC) proposes a solar sail or other large advertising surface deployed on a spacecraft for viewing remotely by camera or by telescope and the company claims to have already had some commercial success with their approach.

Others have in the past proposed not simply filming or projecting images on spacecraft but more ambitiously projecting images onto the moon. The primary proposed means of doing this is by beaming powerful lasers onto the moon's surface from the earth to display advertising on the moon, but such aspirations have always been thwarted by the limitations of laser technology, not least in view of the vast distance (approximately 384,000 km) away for such a beam to travel and the scale of the image and very poor visibility involved. Further thwarting such aspirations are prohibitive legislative measures, including a US ban on obtrusive advertising in space.

Recently granted U.S. Pat. No. 8,515,595 (Moon Publicity Corp.) nevertheless discloses a system for advertising on the moon that entails shaping/casting shadows of defined images on the lunar surface by engraving/re-shaping areas of the lunar surface. This system has some supporters but it is fundamentally reliant on need for deployment and maintenance of powered automotive digging machinery on the moon surface and it is both invasive and obtrusive to the appearance of the moon

SUMMARY OF THE INVENTION

According to a first aspect of the present invention there is provided a system for projecting and viewing images on the lunar surface or other celestial body surface and which comprises:

i) a projector that operates to project an image onto an area of the far side of the moon or other celestial body;

ii) a camera facing the far side of the moon and that operates to capture the image as projected on the moon or other celestial body;

iii) a transmitter to transmit the captured image to a remote viewer.

The far side of the moon or other celestial body is that side of the earth's moon or other celestial body that is farthest from the earth.

In a preferred embodiment the projector is mounted on a satellite that is positioned proximate the far side of the moon. This satellite suitably is in lunar orbit and preferably in lunar stationary orbit around the moon.

In another preferred embodiment the projector may instead be on the lunar surface at an elevation to project an image down onto the surface or be suspended/supported above the lunar surface to view down onto the image.

The projector may comprise a laser. It may be programmed to scant trace one or more beams over the surface of the moon to form an image. The image may be of any desired form and may be static or mobile in appearance. The image may be used for promotional/advertising purposes, for scientific research or for other practical purposes.

The transmitter is suitably adapted to transmit the image by a signal to reach the earth directly or indirectly. Since the image is on the far side of the moon, the initial transmitted signal may need to be boosted/re-transmitted/re-directed to reach the earth from the far side of the moon. A further one or more satellites may be involved in routing the signal to viewers on earth. The viewers may ultimately receive the images via the internet or via other media providers.

The camera capturing the images may be carried on the first satellite or it may be on another satellite or craft or even may itself be on the lunar surface, suitably at a raised elevation, eg a crater wall, to view the image or it may be suspended/supported above the lunar surface to view the image.

Unlike prior proposals the configuration of the present invention to project onto the far side of the moon is unobtrusive, can avoid contravening the established US ban on obtrusive advertising in space. It is localized. It avoids defacing the moon at all as viewed from earth and it can be non-invasive, leaving no mark on the moon's surface.

Furthermore by projecting onto the far side of the moon in the dark phase area of that side of the moon the image contrast can be greatly enhanced as compared to projecting onto the dark phase area of the near side of the moon, since the far side experiences none of the earth-shine reflected sunlight that bathes the moon in the dark phase on the near-side of the moon.

Particularly preferably the projector projects onto the far side of the moon in the dark phase area of that side of the moon but it may alternatively be targeted onto the dark phase on the near-side of the moon.

According to a second aspect of the present invention there is provided a system for projecting viewable images on the surface of the earth's moon or other celestial body that, like the moon, has light and dark phases and which system comprises a projector in the vicinity of the moon or other celestial body that operates to project an image targeted onto an area of the moon or other celestial body that is in dark phase.

By dark phase area we mean that area of the moon or other celestial body (primarily solid bodies of our solar system such as planets, moons or possibly asteroids) that is currently not lit by the sun as opposed to the light phase area that is lit by the sun. In the case of the earth's moon the light and dark phase areas are the areas that are respectively light and dark with the waxing and waning of the moon, cyclically changing as the moon orbits the earth.

By ensuring that the projected image is projected only onto the dark phase area of the moon or other celestial body the contrast of the image is optimized and the image projected onto the moon may be rendered so small as to be visually unobtrusive to the naked eye and yet be clearly visible and readable when located in magnifying optics of a powerful telescope or camera. The image being projected onto the moon also is not obscuring any stars or other features of the night sky.

Preferably the system of this second aspect also comprises a satellite on which the projector is carried. Preferably the satellite is in the vicinity of the moon. By vicinity we mean being within tens of thousands of km from the moon rather than the hundreds of thousands of km distance between the moon and earth.

The satellite preferably is in the vicinity substantially continuously or at least for substantial periods of time. The satellite may be in lunar orbit or in earth orbit. In an alternative embodiment the projector may be based on the surface of the moon/celestial body.

The satellite on which the projector is mounted or the projector's mounting on the support frame or on the satellite may be directionally controlled to point the projector to target the dark phase area of the moon.

Particularly preferably the projector has a controller that is programmed to target, preferably continuously tracking, the dark phase area of the moon. The controller suitably incorporates a tracking algorithm. Suitably the system comprises a sensor that identifies the area of the moon that is in dark phase and a motor that adjusts the orientation and operation of the projector so that the projected image is directed to be in the dark phase area.

The system may further comprise a camera facing the moon or other celestial body and that operates to capture the image as projected on the moon or other celestial body. A transmitter is preferably also provided to transmit the captured image to a remote viewer.

The system for either aspect of the invention may comprise only one satellite, provided that the satellite remains within the Earth's line of sight either continuously or for a substantial period of time.

The features of the system of the first aspect of the present invention and the features of the system of the second aspect of the present invention may be used separately or together in any suitable combination The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

Preferred embodiments of the present invention will now be more particularly described, by way of example only, with reference to the accompanying drawings, wherein.

DETAILED DESCRIPTION OF THE ILLUSTRATED EMBODIMENTS

Figure 1:
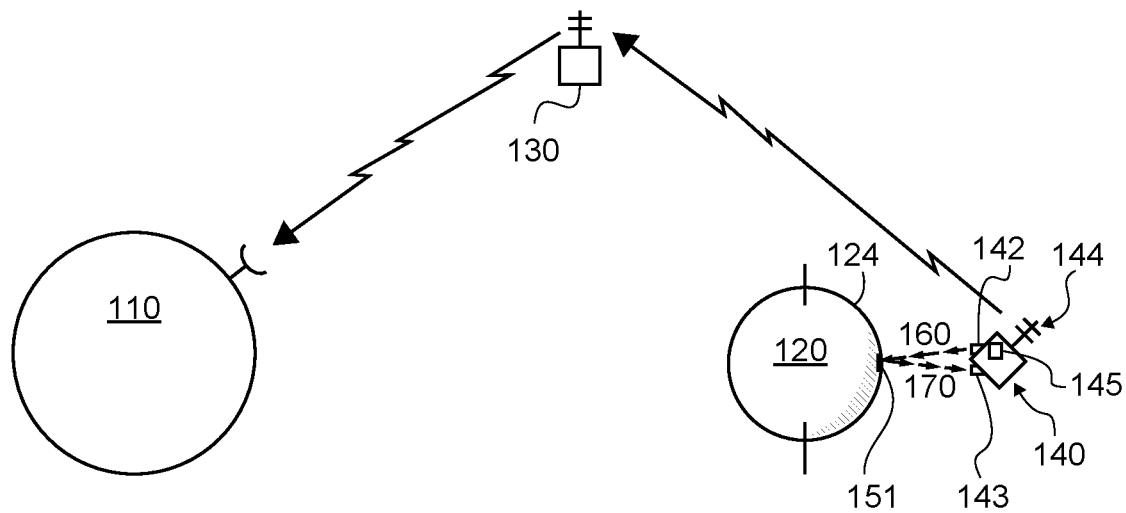
FIG. 1 is a schematic diagram of a satellite-based first preferred embodiment of lunar projection system deployed as in use.

FIG. 1 shows the first preferred embodiment of the system of the first aspect and that comprises a satellite S1 in lunar stationary orbit around the moon M so that it remains substantially continuously in position over the far side of the moon M.

The satellite S1 carries a projector 2 that comprises a powerful laser. The projector 2 is programmed and controlled to project a laser beam B1 down onto the surface of the moon (approximately 57,000 km away) and to shape the beam B1 or to scan the beam B1 to form or trace an image I1 on the surface of the moon M. The image formed or traced by the laser beam B1 on the surface of the moon M may, for example, be a corporate logo as part of an advertizing program and may be static or dynamic. The image can be rendered relatively sharply defined on the lunar surface when directed onto the far side of the moon's surface on the dark phase area DPA of that side of the moon. The projected image can be altered and distorted, as required, to appear in correct perspective on the lunar surface to the viewer.

The satellite S1 on which the projector 2 is mounted and/or the projector's mounting on the satellite S1 is directionally controlled to point the projector 2 to target the dark phase area of the moon M. The projector 2 has a controller 2b that is programmed to target, preferably continuously tracking, the dark phase area DPA of the moon M. The controller 2b incorporates a tracking algorithm and the system may comprise a sensor and/or a log that identifies the area of the moon that is in dark phase and a motor that adjusts the orientation and operation of the projector 2 so that the projected image is directed to be in the dark phase area DPA.

Since the far side of the moon is by definition always turned away from the observer's view from earth, due to the geo-synchronous rotation of the moon with the earth there is, of course, no direct line of sight for the earth-bound viewer to use to see the image formed on the lunar surface. Instead, the system is configured to allow the earth-bound viewer to see the image by electronically capturing the image by camera and transmitting the captured image via satellites or other means/space craft onwards to the viewer on earth.

The system incorporates a camera 3 positioned viewing down onto the image on the lunar surface of the far side of the moon M. In this embodiment the camera 3 is carried on the satellite S1 too and it is mounted pointed broadly in the same direction as the laser beam projector 2 but it is shielded from/not exposed to any of the laser light B1 from the projector 2. The camera 3 may move/track along with the movement/tracking of the dark phase area DPA by the projector 2 and it picks up the light L1 of the image I1 as it is reflected back from the moon's far side surface.

The image data from the camera 3 is then transmitted from the satellite S1 by a transmitter 4 on the satellite S1 to a nearby earth-orbiting second satellite S2 beyond the moon's shadow and thence it is relayed to receivers on earth to be distributed/disseminated as desired, whether via the internet or by other media system. Indeed, the signal from the transmitter 4 may be transmitted to an existing TV media satellite S2 and thence be broadcast to multiple viewers as a satellite TV signal, rather than being first received by a receiver on earth before being distributed.

Figure 2:
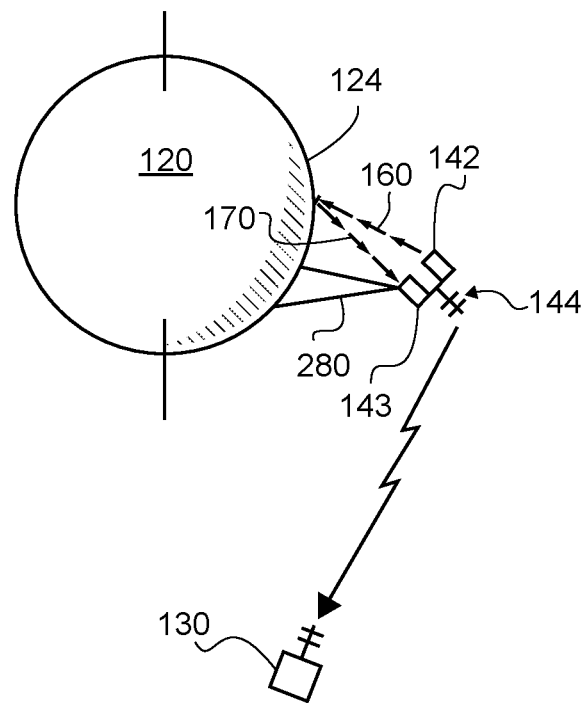
FIG. 2 is a schematic diagram of a moon-based second preferred embodiment of lunar projection system deployed as in use.
Figure 3:
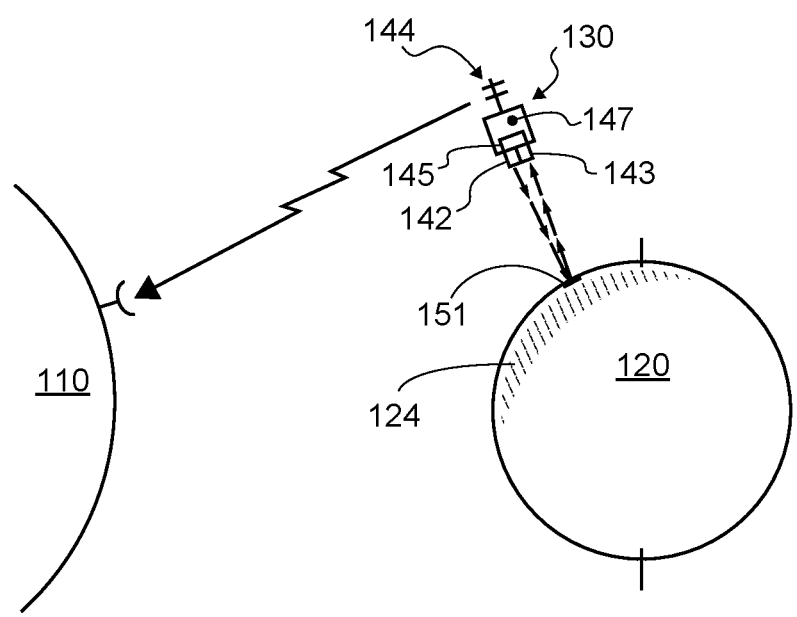
FIG. 3 is a schematic diagram of the satellite-based first preferred embodiment of lunar projection system deployed in the manner of the second aspect of the invention.

In the second preferred embodiment, illustrated in FIG. 2, the projector 2 is positioned on the far side of the moon not based on a satellite but based on the moon itself. It is suitably at an elevation, eg on the side of a crater or supported on a tall frame 5 on the lunar surface, and directing the laser beam B1 onto the moon's surface to form the image on the surface. The camera 3 may be positioned on the lunar surface too, eg alongside the projector 2 on the projector's support frame 5 or at any suitable location relative to the target of the beam 1 to capture digital images of the projected image formed by the laser beam B1 on the lunar surface in the dark phase are DPA.

The captured digital images from the camera 3 are then uploaded to a transmitter 4 that sends the images to a nearby satellite S2 for relaying to earth. Conceivably the transmitter 4 might be net-worked or configured to be able to relay the image data to an earth-orbiting satellite without need for intermediacy of a lunar orbiting satellite.

FIGS. 1 and 2 illustrate use of both first and second aspects of the invention to project the image onto the far side of the moon and targeted in the dark phase area DPA. As noted earlier the system may be adapted instead for use to project the image onto the near side of the moon targeted in the dark phase area DPA. In such case, the projector may be mounted on a support frame on the moon/suspended above the moon surface or, as illustrated in FIG. 1, the projector may be mounted on a satellite S1 in the vicinity of the moon M facing the near side of the moon M and operated to target the projected image I1 onto the surface of the moon M when and where the surface is dark phase area DPA. As with the previous embodiments, the projector 2 is suitably set up with a controller 2b to move the projector 2 and camera 3 to track/target the dark phase area DPA as it shifts across the surface of the moon M.

What is claimed is:

1. A system for rendering information reflected from a surface of a celestial body, the system comprising:
   a satellite in orbit with a dark phase area of the celestial body;
   i) a projector mounted on the satellite, the projector configured to project an image onto the surface of the celestial body;
   ii) a camera mounted on the satellite, the camera oriented to capture a composite image comprising (a) at least a portion the projected image on the surface, and (b) at least a portion of a reflection from the surface of ambient light; and
   iii) a transmitter configured to transmit the composite image to a display of a viewer remote from the camera.

2. The system as claimed in claim 1, wherein at least one of the projector and the camera is positioned on or suspended above the surface.

3. The system as claimed in claim 1, wherein the projector is programmed to scan/trace one or more beams to form the image.

4. The system as claimed in claim 1, wherein the transmitter and system is configured to transmit the image by a signal to reach the earth.

5. The system as claimed in claim 1, wherein the celestial body is the moon.

6. The system as claimed in claim 1, further comprising a controller configured to target the image onto the dark phase area of the celestial body.

7. The system of claim 1, wherein the orbit is a geosynchronous orbit.

8. A method of displaying an image, comprising:
   placing a satellite in orbit with a dark phase area of a celestial body;
   utilizing a projector mounted on the satellite to project an image towards a targeted region of the celestial body, while the targeted region has no direct line of sight for an earth-bound viewer and is in the dark phase area of the celestial body;
   utilizing a camera mounted on the satellite to capture a composite image comprising both (a) the projected image projected onto the targeted region and (b) a background image of the targeted region; and
   providing data from the composite image for visual rendering to a viewer.

9. The method of claim 8, further comprising including an advertisement in the projected image.

10. The method of claim 8, further comprising utilizing the projector to project a dynamic message in the projected image.

11. The method of claim 8, further comprising utilizing a controller to dynamically track the targeted region while the projector is projecting the image.

12. The method of claim 8, further comprising utilizing a portion of the far side of the moon as the targeted region.

13. The method of claim 8, further comprising utilizing a portion of the near side of the moon as the targeted region, during a dark phase of the near side.

14. The method of claim 8, further comprising utilizing at least one satellite to carry at least one of the projector and the camera.

15. The method of claim 8, further comprising utilizing a surface based location for at least one of the projector and the camera.

16. The method of claim 8, further comprising utilizing a location raised above the surface for at least one of the projector and the camera.

17. The method of claim 8, further comprising utilizing social media to distribute the data.

18. The method of claim 8, wherein the background image comprises a reflection of ambient light.

19. The method of claim 8, wherein the orbit is a geosynchronous orbit.

* * * * *